United States Patent
Gustavsson

(10) Patent No.: US 6,292,726 B1
(45) Date of Patent: Sep. 18, 2001

(54) SYSTEM AND METHOD FOR CONTROLLING THE SWITCHING ON OF ANCILLARY EQUIPMENT DRIVEN BY AN ENGINE

(75) Inventor: Tommy Gustavsson, Frillesås (SE)

(73) Assignee: Volvo Lastvagnar AB, Gothenborg (SE)

( * ) Notice: Subject to any disclaimer, the term of this patent is extended or adjusted under 35 U.S.C. 154(b) by 0 days.

(21) Appl. No.: 09/284,056

(22) PCT Filed: Oct. 10, 1997

(86) PCT No.: PCT/SE97/01693

§ 371 Date: May 28, 1999

§ 102(e) Date: May 28, 1999

(87) PCT Pub. No.: WO98/17493

PCT Pub. Date: Apr. 30, 1998

(30) Foreign Application Priority Data

Oct. 18, 1996 (SE) ................................. 9603832

(51) Int. Cl.$^7$ ............................. F16H 61/00; G06F 15/50
(52) U.S. Cl. ............................. 701/36; 477/33; 477/108; 477/121; 477/169; 123/322; 246/182 R; 340/994; 180/170
(58) Field of Search ..................... 701/36, 67; 477/30, 477/47, 95, 118, 171, 166, 62

(56) References Cited

U.S. PATENT DOCUMENTS

| | | |
|---|---|---|
| 4,460,056 | 7/1984 | Jaccob ................................. 180/53.7 |
| 5,239,472 * | 8/1993 | Longe et al. .................... 364/426.05 |
| 5,921,883 * | 7/1999 | Bellinger ................................. 477/33 |
| 5,935,043 * | 8/1999 | Watanabe et al. .................... 477/169 |
| 6,009,365 * | 12/1999 | Takahara ................................. 701/54 |
| 6,024,673 * | 2/2000 | Hayashi et al. ....................... 477/171 |

FOREIGN PATENT DOCUMENTS

0645271 A2    3/1995   (EP) .

* cited by examiner

*Primary Examiner*—Tan Nguyen
*Assistant Examiner*—Tuan C To
(74) *Attorney, Agent, or Firm*—Samuels, Gauthier & Stevens, LLP

(57) ABSTRACT

A method and system for controlling the switching in of ancillary equipment driven by an engine of a vehicle, the ancillary equipment being arranged to be driven by the engine until at least a minimum operating level relating to the status of the ancillary equipment is attained. The method includes the steps of: determining in which of three modes the vehicle is in, these modes being a first mode in which the engine is driving the vehicle, a second mode in which the vehicle is being braked and a third mode in which the vehicle is coasting; and in the first mode causing the ancillary equipment to be switched in only if the status of the ancillary equipment is below a predetermined minimum level; in the second mode causing the ancillary equipment to be switched in if the status of the ancillary equipment is below a predetermined maximum level; and in the third mode causing the ancillary equipment to be switched in only if the status of the ancillary equipment is below a predetermined intermediate level between the maximum level and the minimum level.

10 Claims, 2 Drawing Sheets

SYSTEM AND METHOD FOR CONTROLLING THE SWITCHING ON OF ANCILLARY EQUIPMENT DRIVEN BY AN ENGINE

TECHNICAL FIELD

The present invention relates to a system and a method for controlling the switching in of ancillary equipment driven by an engine of a vehicle, said ancillary equipment being arranged to be driven by said engine until at least a minimum operating level relating to the status of said ancillary equipment is attained.

BACKGROUND OF THE INVENTION

It is a general goal within the vehicle industry to reduce fuel consumption of vehicles, both to save natural resources and to reduce exhaust emissions. The fuel consumption of a motor vehicle can be reduced not only by optimizing the efficiency of the vehicle's engine, but also by e.g. reducing the weight of the vehicle and its aerodynamic drag. Even once the design of an engine and the vehicle to which it is been fitted has been established, it is still possible to affect the actual fuel consumption of the vehicle by ensuring that the engine is placed under load only when absolutely necessary.

In this respect, it is to be observed that the engine of a vehicle is employed not only to propel the vehicle, but also to drive ancillary equipment such as pumps and electrical generators. A typical example of a piece of ancillary equipment for a commercial vehicle is an air compressor for charging an air tank used to power the vehicle's braking system. Upon starting the engine of a vehicle equipped with such a braking system, the air compressor is driven by the engine until at least a minimum operating value of air pressure is attained in the air tank. Thereafter, the air pressure in the tank is maintained between predetermined maximum and minimum values by recharging the tank each time the air pressure drops below the minimum value. Naturally, each time the air compressor is switched in, a load is placed on the engine.

It is known from e.g. EP-A-0 335 086 to provide a system which detects when a vehicle engine is not being used to propel the vehicle and to allow ancillary equipment to be switched on under such a condition. Thus, in said document, a sensor detects when the throttle pedal is released, thereby indicating that no additional propulsive force is presently required by the driver, and thereafter allows ancillary equipment to be switched on should activation of the equipment be necessary. For example, if the air pressure in the air tank is at a low level, once the throttle is released, the air compressor is switched on. Since the engine is not being used to propel the vehicle, it will be the kinetic energy of the vehicle which drives the air compressor. As such, the engine requires no additional fuel to compensate for the load placed on the engine by the air compressor.

Although the system described above makes use of the kinetic energy of the vehicle to power items of ancillary equipment, the switching on of the ancillary equipment will increase the engine braking effect of the engine on the vehicle. As a consequence, a condition may arise in which the driver of the vehicle, when anticipating the need to reduce the speed of the vehicle somewhat due to the fact that e.g. the vehicle is approaching a corner, lifts his foot from the throttle to allow the vehicle to coast under normal engine braking. If, however, the lifting of his foot from the throttle pedal should result in a piece of ancillary equipment switching on, then the degree of engine braking will be greater than that anticipated by the driver. As a consequence, the driver may well need to reapply the throttle to ensure that the vehicle reaches the corner at the originally intended speed.

Since every application of the throttle implies an increase in the consumption of fuel, it would be desirable to provide a system which could ensure that increased engine braking due to the switching on of ancillary equipment occurs only when it is desirable to significantly reduce the kinetic energy of the vehicle.

SUMMARY OF THE INVENTION

It is therefore an object of the present invention to provide a system by means of which the kinetic energy of a vehicle can be conserved to as high an extent as possible by carefully controlling when switching on of ancillary equipment takes place.

This object is achieved by the system according to claim 1.

In accordance with the present invention, by distinguishing between "active" braking, i.e. activation of a vehicle braking system, and merely coasting of the vehicle, the system can ensure that, within certain safety constraints, ancillary equipment is switched on only when the vehicle is being actively braked.

It is a further object of the present invention to provide a method for optimising the timing of the switching on of ancillary equipment driven by an engine of a vehicle.

This object is achieved by the method according to claim 4.

Advantageous embodiments of the invention are detailed in the respective dependent claims.

BRIEF DESCRIPTION OF THE DRAWINGS

The invention will be described in the following in greater detail by way of example only and with reference to the attached drawings, in which.

DETAILED DESCRIPTION OF PREFERRED EMBODIMENTS:

Although the present invention may be practiced on any motor vehicle which is provided with ancillary equipment driven by the vehicle's engine, the invention will be described in the following when applied to a heavy goods vehicle (HGV).

An HGV is normally propelled by a diesel engine. The engine is further used to drive ancillary equipment. Within the context of the present invention, the term "ancillary equipment" covers any system on the vehicle which requires intermittent charging or input from the engine. A non-exhaustive list of examples of such systems includes a primary braking system which utilizes a source of compressed air generated by an air compressor driven by the vehicle's engine, a cooling fan for assisting in the cooling of the engine, a servo system for the steering system of the vehicle, an alternator for charging batteries in the vehicle, and a compressor for an air-conditioning unit. For the sake of clarity, the present invention will be described in the following with respect to the air supply for the braking system of a HGV.

Figure 1:
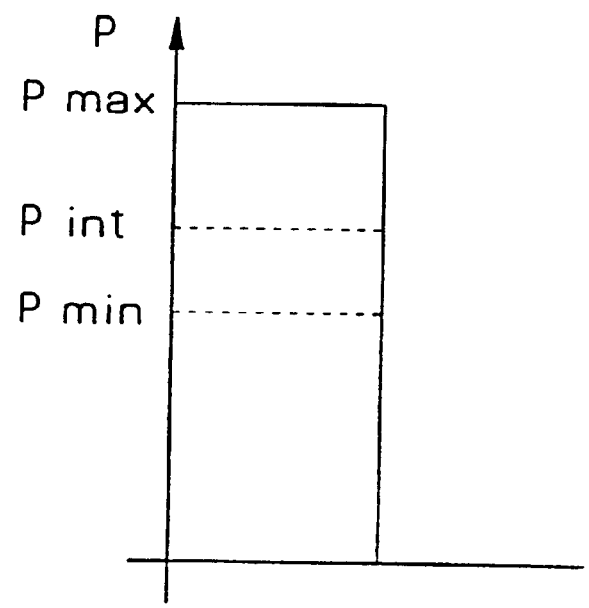
FIG. 1 is a schematic representation of various pressure levels in a piece of ancillary equipment.

With reference to FIG. 1, the braking system of an HGV is designed to operate between a maximum pressure $P_{max}$ and a minimum pressure $P_{min}$ of compressed air. The compressed air is stored in an air tank and the tank is charged by an air compressor driven by the engine of the vehicle. Typical values for $P_{max}$ and $P_{min}$ are 12 bar and 8 bar respectively.

Figure 2:
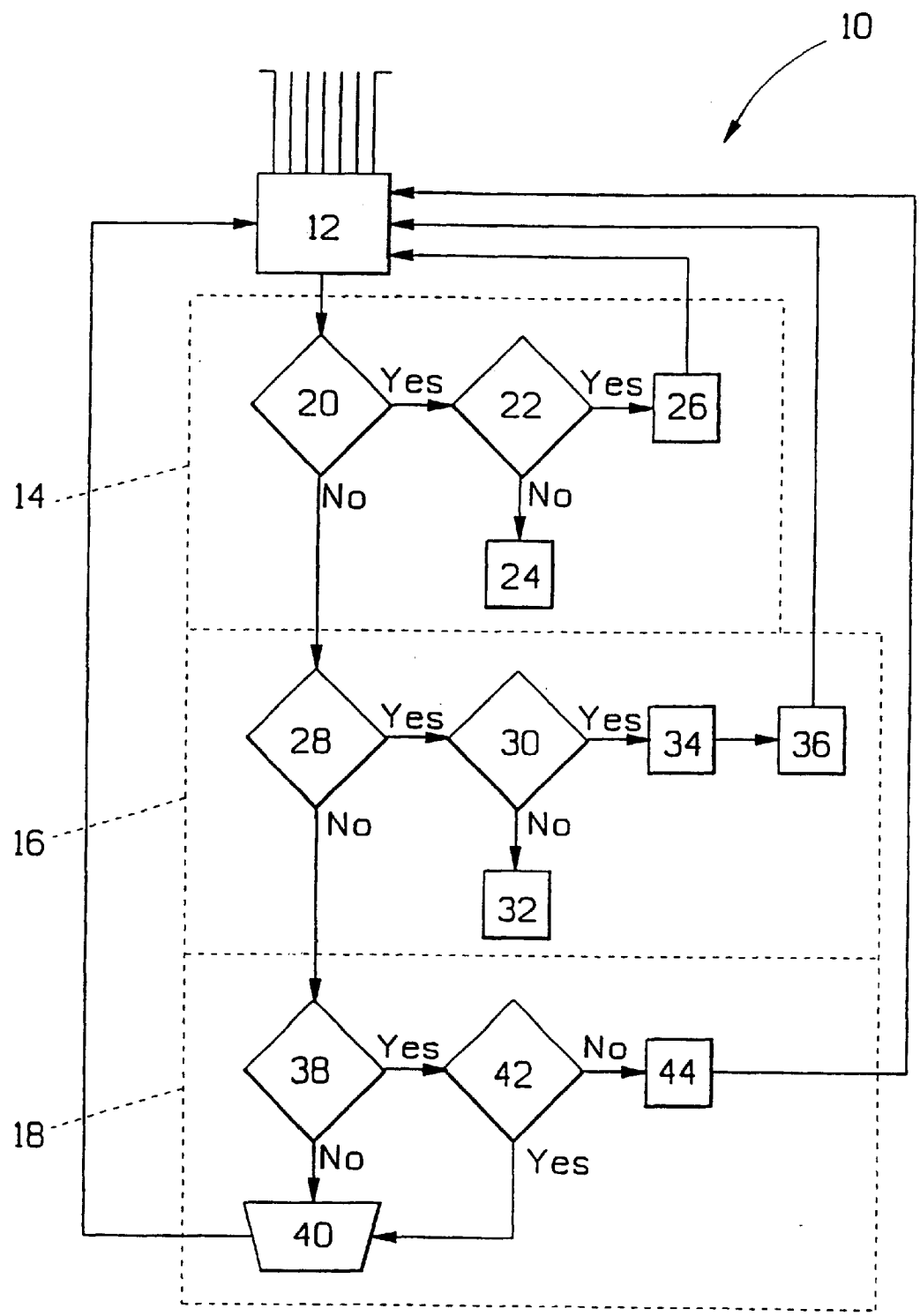
FIG. 2 is a block diagram of one embodiment of the system according to the present invention.

In FIG. 2, reference numeral 10 generally denotes a system according to the present invention for controlling the switching in of the air compressor. The system comprises a central processing unit (CPU) 12 which collects data relating to various operating parameters of the vehicle. These parameters include the speed of the vehicle, the engine speed, the amount of fuel delivered to the engine and the intake manifold pressure. Parameters relating to the status of ancillary equipment are also delivered to the CPU 12. In the present embodiment, this parameter is the prevailing pressure in the air tank.

The system 12 further comprises means for determining whether the engine is driving the vehicle, whether the vehicle is being braked or whether the vehicle is merely coasting. In this respect, the term "coasting" means that the driver of the vehicle is neither applying any pressure on the throttle pedal nor applying any brakes. Accordingly, the term "braked" implies that the driver of the vehicle is applying some form of braking over and above normal engine braking. Such a form of braking could be via the foot-operated brake system or via a hand-operated exhaust brake or the like. For the sake of clarity, in FIG. 2 first, second and third means are illustrated for determining whether each of the three above-mentioned conditions prevail. It will, however, be apparent to the skilled man that since one of the three above-mentioned conditions is always present when a vehicle is moving, it is sufficient to provide means for determining whether any two of the three conditions are present since the third condition will automatically prevail if neither of the other two do.

Thus, the system according to the present invention comprises first means 14 for determining whether the engine is driving the vehicle, second means 16 for determining whether the vehicle is braking and third means 18 for determining whether the vehicle is coasting.

In the first means 14, the CPU is asked at box 20 whether the engine is driving the vehicle. If the answer is yes, the first means asks at box 22 whether the status of any ancillary equipment is below a predetermined minimum level. In the present example, such status corresponds to a pressure level in the air tank lower than $P_{min}$. If the status of the ancillary equipment is above the predetermined minimum level, then the first means does not switch on the ancillary equipment. This condition is indicated by box 24 in FIG. 2. If, however, the status of the ancillary equipment is below the predetermined minimum level, the first means cause the ancillary equipment to be switched on, as represented by box 26. In the present example, the air compressor would thus be switched in at box 26 and would continue to operate until a predetermined level of pressure is established in the air tank, which level does not necessarily need to correspond to the maximum level $P_{max}$.

From the above, it will be apparent that the ancillary equipment is only switched on when the engine is driving the vehicle if the status of any ancillary equipment is below a predetermined minimum level.

Should the first means 14 indicate at box 20 that the engine is not driving the vehicle, a "no" signal is sent to the second means and the second means 16 determine at box 28 whether the vehicle is braking. If the vehicle is found to be braking, the second means ask at box 30 whether the status of any ancillary equipment is below a predetermined maximum level. In the present example, such status corresponds to a pressure level in the air tank lower than $P_{max}$. If the ancillary equipment has a status corresponding to the predetermined maximum level, the ancillary equipment is not of course switched in. This condition is represented by box 32 in FIG. 2. Should, however, the status of the ancillary equipment be below the predetermined maximum value, the second means cause the ancillary equipment to be switched on. This condition is represented by box 34 in FIG. 2.

Once braking is terminated, it may occur that the status of the ancillary equipment is still below the predetermined maximum value. This being the case, the second means 16 informs the CPU at box 36 of the actual status of the equipment.

Should the second means indicate at box 28 that the vehicle is not being braked, then it is apparent that the vehicle must be coasting. This condition is represented by a "no" signal emitted from box 28 entering the third means 18.

As previously explained, it is not always desirable to permit ancillary equipment to be switched on when a vehicle is coasting, since the switching on of the equipment will cause an increase in engine braking. On the other hand, it is preferable to switch on ancillary equipment during coasting rather than when the engine is driving the vehicle. Thus, in accordance with the present invention, a predetermined intermediate level of the status of the ancillary equipment is stored in the CPU, this intermediate level being denoted by $P_{int}$ in FIG. 1. Typically, the value of $P_{int}$ may be about 9.5 bar. In a manner which will be explained below, the third means are adapted to cause the ancillary equipment to be switched on only if the status of the equipment is below this predetermined intermediate level. This implies that, in the example of the air compressor, the air compressor would be switched on if the pressure in the air tank were below $P_{int}$ when the vehicle was coasting.

In the third means 18, it is established at box 38 whether the status of the ancillary equipment lies below the predetermined intermediate level. If this is not the case, then the third means commands the CPU 12 to wait until the vehicle is braking before switching in the ancillary equipment. This condition is represented by box 40 in FIG. 2. On the other hand, should the status of the ancillary equipment be below the predetermined intermediate level, switching on of the ancillary equipment becomes a possibility.

In a preferred embodiment of the invention, the ancillary equipment is not automatically switched on as soon as it is determined at box 38 that the status of the equipment is below the intermediate level. Instead, the third means 18 may incorporate or communicate with datalogging means in which parameters relating to operating conditions of the vehicle over a predetermined, immediately preceding, time interval are stored. Thus, at box 42, the third means analyze the parameters relating to the operating conditions to determine the likelihood of the vehicle being braked in the immediate future. If an analysis of the parameters indicates that no braking has taken place for a relatively long time, then it may be deduced that the vehicle is proceeding along a relatively flat, straight road. Such being the case, the third means causes the ancillary equipment to be switched on at box 44 for the period when coasting is taking place. Of course, the ancillary equipment does not necessarily have to be kept switched in during coasting until the maximum predetermined level is reached. Instead, an intermediate cutout level lying between $P_{int}$ and $P_{max}$ may be selected.

If after a period of coasting the vehicle is braked, then the ancillary equipment will continue to be switched on provided its status is below the predetermined maximum level.

Conversely, should the coasting phase be followed by an application of throttle, the ancillary equipment will be immediately switched out and the current status of the ancillary equipment noted in the CPU.

If the analysis of parameters represented by box 42 in the datalogging means indicates that a reasonable possibility exists that the vehicle will be braked in the near future, the third means commands the CPU 12 to wait until the vehicle is braking before switching in the ancillary equipment. This condition is represented by box 40 in FIG. 2.

Figure 3:
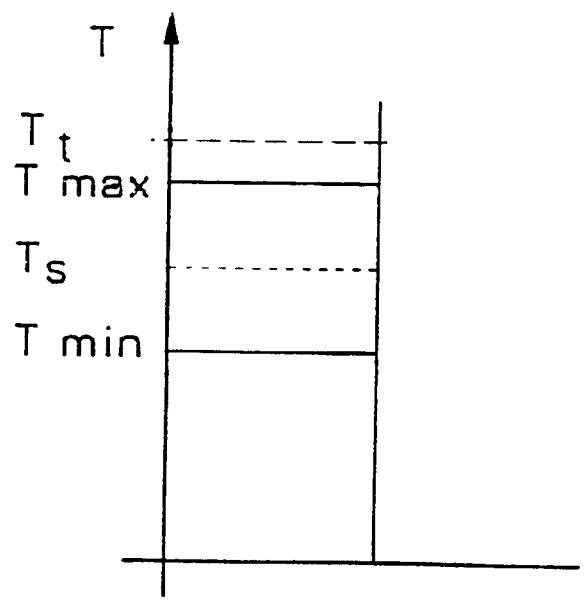
FIG. 3 is a schematic representation of various temperature levels in a piece of ancillary equipment.

In a modification of the present invention, the system may be used to control a compressor in an air conditioning unit. Such an air conditioning unit may either be a cab-mounted device or a refrigeration unit for goods carried on the vehicle. In the following, this modification will be described in relation to a cab-mounted air conditioning device with which the driver selects a suitable temperature for the interior of the cab. With reference to FIG. 3, the driver selects a temperature $T_s$, for example 21° C. The system according to the present invention then establishes a maximum temperature $T_{max}$, e.g. 22° C. and a minimum temperature $T_{min}$, e.g. 20° C., to establish a range within which the cabin temperature is allowed to fluctuate. A temporary maximum value $T_t$ is also established, e.g. 23° C. If during braking, the temperature in the cab increases above $T_{max}$, the compressor is switched on to bring the temperature down towards $T_{min}$. Similarly, if during coasting the temperature in the cab is approaching $T_{max}$, the compressor may be switched on. Should, however, the temperature in the cab exceed $T_{max}$ whilst the engine is driving the vehicle, switching on of the compressor will be delayed in the hope that the mode of the vehicle will shortly change over to braking or coasting. Thus, the temperature of the cabin is allowed to reach $T_t$ before the compressor will automatically be switched on.

Naturally, the present invention is not restricted to the embodiments described above and shown in the drawings, but may instead be varied within the scope of the appended claims. For example, in order to prevent ancillary equipment from being switched on when the driver lifts his foot temporarily from the throttle, for example during gear changing, a delay may be incorporated in the system, for example in the third means. Furthermore, under certain circumstances, it may be beneficial to allow the ancillary equipment to be fully charged in one continuous cycle. This may occur for example in city driving when the vehicle is frequently accelerating, braking and coasting. In the case in which the ancillary equipment includes a cooling fan for assisting in the cooling of the engine, it will be apparent to the skilled person that the predetermined minimum level will be a temperature above which the fan is automatically switched on, whilst the predetermined maximum level will be a temperature below which the fan will not be operated.

What is claimed is:

1. A system for controlling the switching on of ancillary equipment driven by an engine of a vehicle, said ancillary equipment being arranged to be driven by said engine until at least a minimum operating level relating to the status of said ancillary equipment is attained, said system comprising:

first means for determining whether said engine is driving said vehicle;

second means for determining whether said vehicle is braking, and third means for determining whether said vehicle is coasting, wherein said first means will cause said ancillary equipment to be switched on only if the status of said ancillary equipment is below a predetermined minimum level ($P_{min}$);

said second means will cause said ancillary equipment to be switched on if the status of said ancillary equipment is below a predetermined maximum level ($P_{max}$); and said third means will cause said ancillary equipment to be switched on only if the status of said ancillary equipment is below a predetermined intermediate level ($P_{int}$) between said maximum level ($P_{max}$) and said minimum level ($P_{min}$).

2. The system as claimed in claim 1, wherein said third means communicates with datalogging means in which parameters relating to operating conditions of the vehicle over a predetermined, immediately preceding, time interval are stored.

3. A method for controlling the switching on of ancillary equipment driven by an engine of a vehicle, said ancillary equipment being arranged to be driven by said engine until at least a minimum operating level relating to the status of said ancillary equipment is attained, said method comprising:

determining in which of three modes said vehicle is in, said three modes being a first mode in which said engine is driving said vehicle, a second mode in which said vehicle is being braked and a third mode in which said vehicle is coasting, and in said first mode causing said ancillary equipment to be switched on only if the status of said ancillary equipment is below a predetermined minimum level;

in said second mode causing said ancillary equipment to be switched on if the status of said ancillary equipment is below a predetermined maximum level, and in said third mode causing said ancillary equipment to be switched on only if the status of said ancillary equipment is below a predetermined intermediate level between said maximum level and said minimum level.

4. The method as claimed in claim 3, wherein when said third mode is entered, account is taken of parameters relating to operating conditions of the vehicle over a predetermined, immediately preceding, time interval before deciding whether said ancillary equipment is to be switched on.

5. The system as claimed in claim 1, wherein said ancillary equipment comprises equipment on the vehicle which requires intermittent charging or input from the engine.

6. The system as claimed in claim 1, wherein said ancillary equipment comprises an air compressor for a braking system.

7. The system as claimed in claim 1, wherein said ancillary equipment comprises a cooling fan for assisting in the cooling of the engine.

8. The system as claimed in claim 1, wherein said ancillary equipment comprises a servo system for the steering system of the vehicle.

9. The system as claimed in claim 1, wherein said ancillary equipment comprises an alternator for charging batteries in the vehicle.

10. The system as claimed in claim 1, wherein said ancillary equipment comprises a compressor for an air-conditioning unit.

\* \* \* \* \*